(12) United States Patent
Chen et al.

(10) Patent No.: US 7,038,863 B2
(45) Date of Patent: May 2, 2006

(54) COMPACT, WIDE-FIELD-OF-VIEW IMAGING OPTICAL SYSTEM

(75) Inventors: Chungte W. Chen, Irvine, CA (US); J. Steve Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/859,886

(22) Filed: Jun. 2, 2004

(65) Prior Publication Data

US 2005/0270660 A1 Dec. 8, 2005

(51) Int. Cl.
*G02B 27/22* (2006.01)

(52) U.S. Cl. .................. 359/725; 359/419; 359/462

(58) Field of Classification Search ............... 359/419, 359/725, 771, 462; 348/335, 369
See application file for complete search history.

(56) References Cited

U.S. PATENT DOCUMENTS

| | | | |
|---|---|---|---|
| 4,518,231 A | 5/1985 | Muchel et al. | |
| 4,634,241 A | 1/1987 | Kohayakawa et al. | |
| 5,148,314 A | 9/1992 | Chen | |
| 5,225,861 A | 7/1993 | Marks | |
| 5,245,479 A | 9/1993 | Falanga | |
| 5,485,306 A * | 1/1996 | Kiunke et al. | ............... 359/419 |
| 5,625,499 A | 4/1997 | Chen | |
| 5,652,681 A | 7/1997 | Chen et al. | |
| 6,473,239 B1 * | 10/2002 | Volcker et al. | ............. 359/624 |

* cited by examiner

*Primary Examiner*—Hung Xuan Dang
*Assistant Examiner*—Joseph Martinez
(74) *Attorney, Agent, or Firm*—John E. Gunther; Leonard A. Alkov; Karl A. Vick

(57) ABSTRACT

An imaging optical system includes a first imaging structure having a first optical axis and a first field of view, wherein the first imaging structure forms an image on a common focal plane, and a second imaging structure having a second optical axis parallel to the first optical axis and a second field of view different from the first field of view, wherein the second imaging structure forms an image on the common focal plane. The imaging structures preferably contain identical lens modules, most preferably identical Petzval lenses, and achromatic or apochromatic prisms of different spatial orientations. A planar sensor structure lies in the common focal plane, wherein the first optical axis and the second optical axis pass through the planar sensor structure.

10 Claims, 3 Drawing Sheets

COMPACT, WIDE-FIELD-OF-VIEW IMAGING OPTICAL SYSTEM

This invention relates to a wide-field-of-view optical system and, more particularly, to such an optical system having a short physical length and a small size.

BACKGROUND OF THE INVENTION

Wide-field-of-view (WFOV) imaging optical systems are used in a number of applications. For example, surveillance systems, helmet-mounted sensors, missile warning sensors for aircraft, and space and aircraft acquisition sensors all may use WFOV optical systems. In this context, a WFOV optical system typically seeks a field of view of at least 60 degrees in at least one dimension.

Most WFOV imaging optical systems are of the inverse telephoto or fisheye type. The inverse telephoto optical system has a front (that is, nearest the scene) lens or lens group with a negative optical power, in order to view a wide field of view, and a rear (that is, nearest the eye or the sensor) lens or lens group with a positive optical power to focus the light rays onto the focal plane. This distribution of optical powers is necessary to minimize the angle of incidence of the chief ray, thereby minimizing the aberration. The associated effect, however, is that the incoming beam first diverges when it passes through the negative-optical-power front lens or lens group. The additional lenses required to focus the light beam to the focal plane result in an overall length of the optical system that is typically 3–8 times the effective focal length. It is therefore difficult to design a compact, light-weight WFOV optical system. Additionally, the numerical aperture of the inverse telephoto lens is typically relatively small, resulting in a low signal-to-noise ratio and a required long exposure time to produce a usable image.

There is a need in many applications for a WFOV imaging optical system that is more compact and lighter in weight than the inverse telephoto lens. The present invention fulfills this need, and further provides related advantages.

SUMMARY OF THE INVENTION

The present invention provides a wide-field-of-view (WFOV) imaging optical system that is compact and light in weight, and is typically one-half or less of the length of a WFOV inverse telephoto lens system having a comparable field of view. The WFOV imaging optical system may also have a large numerical aperture, resulting in good light gathering capability, a high signal-to-noise ratio, and good light sensitivity.

In accordance with the invention, an imaging optical system comprises a first imaging structure having a first field of view and a second imaging structure parallel to the first imaging structure and having a second field of view different from the first field of view. The first imaging structure includes a first lens module having a first-lens-module input end, a first optical axis, and a first focal plane, and an achromatic or apochromatic first prism positioned adjacent to the first-lens-module input end and having a first prism outer face remote from the first-lens-module input end. The first optical axis passes through the first prism, and the first prism has a first normal orientation of the first prism outer face. The second imaging structure includes a second lens module having a second-lens-module input end, a second optical axis parallel to the first optical axis, and a second focal plane. The first focal plane and the second focal plane are coplanar in a common focal plane. The second imaging structure further includes an achromatic or apochromatic second prism positioned adjacent to the second-lens-module input end and having a second prism outer face remote from the second-lens-module input end. The second optical axis passes through the second prism, and the second prism has a second normal orientation of the second prism outer face different from the first normal orientation of the first prism outer face. It is preferred that the first lens module and the second lens module are identical. Preferably, there is an opaque light baffle between the two imaging structures to isolate them and prevent spillover of light from one to the other.

A planar sensor structure lies in the common focal plane. The first optical axis and the second optical axis pass through the planar sensor structure. Most preferably, the planar sensor structure is exactly one focal plane array that senses the images of both of the imaging structures, although more than one focal plane array may be used in some applications. The planar sensor structure may be selected as sensitive to any light wavelength, including ultraviolet, visible, and infrared, and subranges thereof.

The lens modules may be of any operable type. Preferably, the first lens module comprises a first Petzval lens, and the second lens module comprises a second Petzval lens. Most preferably, the two Petzval lenses are identical.

Desirably, the first normal orientation and the second normal orientation both lie in a first-second optical axis plane that also contains the first optical axis and the second optical axis. A field of view of the imaging optical system in the first-second optical axis plane is a sum of the first field of view in the first-second optical axis plane plus the second field of view in the first-second optical axis plane.

The above-described approach increases the field of view in the first-second optical axis plane. To increase the field of view in a plane perpendicular to the first-second optical axis plane, and thereby achieve an increased field of view over all angles, the imaging optical system may further include a third imaging structure having a third optical axis parallel to the first optical axis and a third field of view. The third imaging structure forms an image on the common focal plane. The imaging optical system has a fourth imaging structure having a fourth optical axis parallel to the third optical axis and a fourth field of view different from the third field of view. The fourth imaging structure forms an image on the common focal plane. The third optical axis and the fourth optical axis lie in a third-fourth optical axis plane that is perpendicular to the first-second optical axis plane. The result is increased fields of view about two mutually perpendicular axes that are each perpendicular to the optical axes. Where there are more than two imaging structures, there is preferably an opaque light baffle isolating each of the imaging structures from the other imaging structures.

In another embodiment, an imaging optical system comprises a first imaging structure having a first optical axis and a first field of view, wherein the first imaging structure forms an image on a common focal plane, and a second imaging structure having a second optical axis parallel to the first optical axis and a second field of view different from the first field of view. The second imaging structure also forms an image on the common focal plane. A planar sensor structure lies in the common focal plane, and the first optical axis and the second optical axis pass through the planar sensor structure. Compatible features discussed elsewhere herein may be used with this embodiment as well, and there may be a third and fourth imaging structure oriented to increase the field of view in the third-fourth optical axis plane perpendicular to the first-second optical axis plane.

The present approach provides a WFOV imaging optical system that is more compact than conventional WFOV optical systems such as the inverse telephoto optical system. The length of the present WFOV imaging optical system is typically one-half or less of the length of the inverse telephoto optical system having the same field of view. The present approach also has a large numerical aperture, leading to a high signal-to-noise ratio for the imaging optical system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
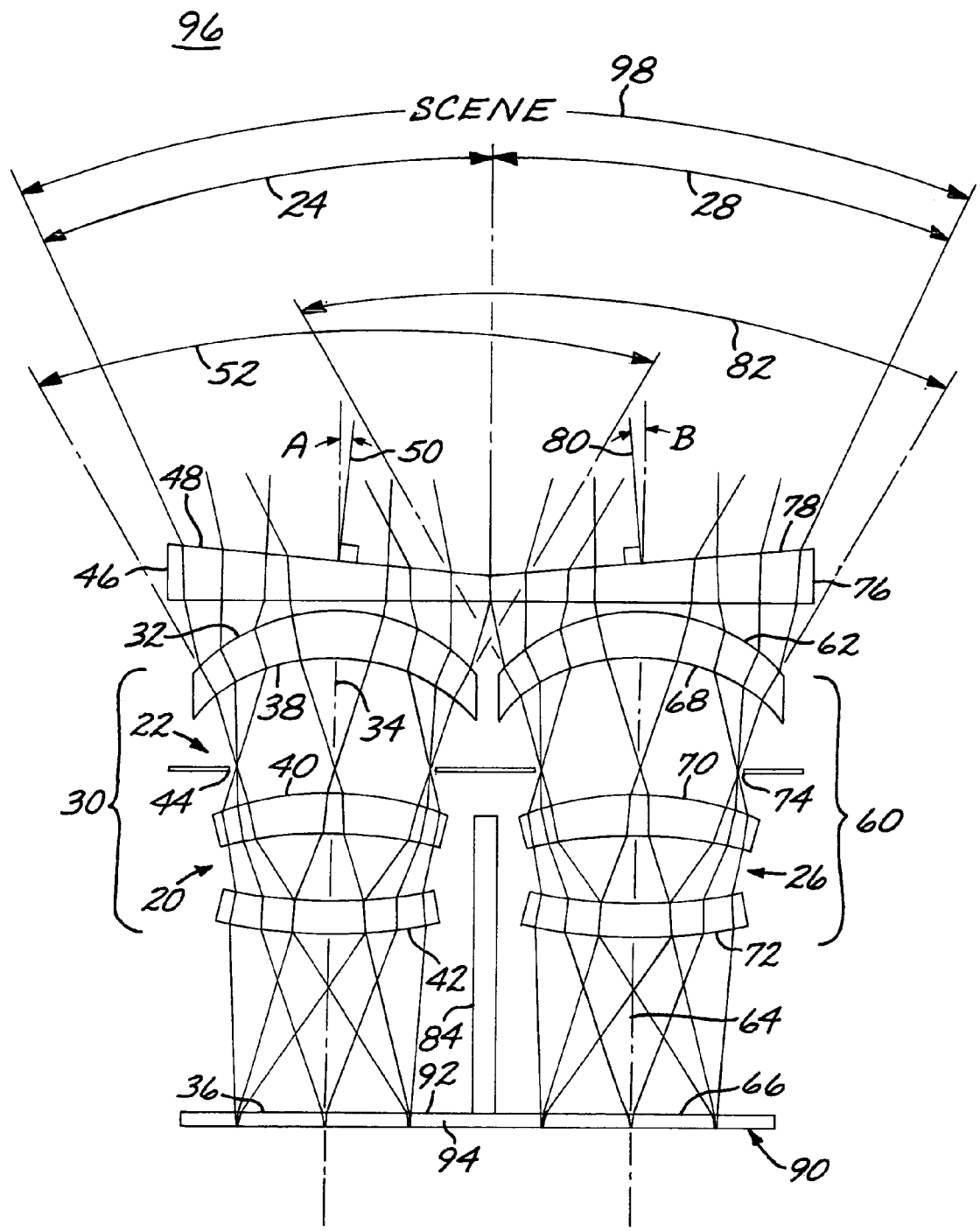
FIG. 1 is a schematic elevational ray-path drawing of an imaging optical system according to the present approach.

FIG. 1 depicts an imaging optical system 20. The imaging optical system 20 includes a first imaging structure 22 having a first field of view 24, and a second imaging structure 26 parallel to the first imaging structure 22 and having a second field of view 28 different from the first field of view 24.

The first imaging structure 22 includes a first lens module 30 having a first-lens-module input end 32 closest to the scene, a first optical axis 34, and a first focal plane 36. The depicted preferred embodiment of the first lens module 30 includes a first lens 38, a second lens 40, and a third lens 42, although other specific lens arrangements may be used. The first lens 38 is between the input end 32 and an aperture stop 44, and the second lens 40 and third lens 42 are between the aperture stop 44 and the first focal plane 36. The lenses of the first lens module 30 are selected to image light rays entering the input end 32 from a scene onto the first focal plane 36. The first lens module 30 has a viewing field 52 (in the absence of a prism).

The first lens module 30 is preferably a Petzval lens. In the Petzval lens, the first lens 38 (or grouping of lenses on one side of the aperture stop 44, here the side closest to the scene) has a positive optical power, and the second lens 40 and third lens 42 (the lenses on the other side of the aperture stop 44, here the side closest to the first focal plane 36) together have a positive optical power. By contrast and will be discussed in greater detail subsequently in relation to FIG. 5, in the inverse telephoto lens the lens group closest to the scene has a negative optical power.

The first imaging structure 22 further includes an achromatic or apochromatic first prism 46 positioned adjacent to the first-lens-module input end 32 and having a first prism outer face 48 remote from the first-lens-module input end 32. An achromatic prism has no primary angular spread. An apochromatic prism has no primary angular spread and no secondary angular spread. See, for example, U.S. Pat. No. 5,625,499, whose disclosure is incorporated by reference. The first optical axis 34 passes through the first prism 46. The first prism 46 may be described as having a first normal orientation 50 of the first prism outer face 48.

The second imaging structure 26 includes a second lens module 60 having a second-lens-module input end 62 closest to the scene, a second optical axis 64, and a second focal plane 66. The depicted preferred embodiment of the second lens module 60 includes a first lens 68, a second lens 70, and a third lens 72, although other specific lens arrangements may be used. The first lens 68 is between the input end 62 and an aperture stop 74, and the second lens 70 and third lens 72 are between the aperture stop 74 and the second focal plane 66. The lenses of the second lens module 60 are selected to image light rays entering the input end 62 from a scene onto the second focal plane 66. The second lens module 60 has a viewing field 82 (in the absence of a prism).

The second lens module 60 is preferably a Petzval lens. In the Petzval lens, the first lens 68 (or grouping of lenses on one side of the aperture stop 74) has a positive optical power, and the second lens 70 and third lens 72 (the lenses on the other side of the aperture stop 74) together have a positive optical power.

Preferably, the first lens module 30 and the second lens module 60 are identical and, more preferably, are identical Petzval lenses.

The second imaging structure 26 further includes an achromatic or apochromatic second prism 76 positioned adjacent to the second-lens-module input end 62 and having a second prism outer face 78 remote from the second-lens-module input end 62. The second optical axis 64 passes through the second prism 76. The second prism 76 may be described as having a second normal orientation 80 of the second prism outer face 78. The second normal orientation 80 of the second prism outer face 78 is and must be different from the first normal orientation 50 of the first prism outer face 48.

That is, although the first lens module 30 and the second lens module 60 may be identical in structure, the first imaging structure 22 and the second imaging structure 26 may not be identical both in structure and in spatial orientation, because the second normal orientation 80 of the second prism outer face 78 is and must be different from the first normal orientation 50 of the first prism outer face 48. The directions of the normal orientations 50 and 80, as well as the index of refraction of the prism, determine the angular positions of the respective fields of view 24 and 28 of the respective imaging structures 22 and 26. The first imaging structure 22 and the second imaging structure 26 are therefore necessarily not identical to each other in structure and spatial orientation in order to achieve an enhanced total field of view of the imaging optical structure 20, because of the different orientations of the first prism 46 and the second prism 76. The first imaging structure 22 and the second imaging structure 26 may be identical in physical structure, but they cannot be identical in spatial orientation. If the first imaging structure 22 and the second imaging structure 26 were identical to each other in respect to the spatial orientations of the prisms 46 and 76, the present approach would not function in its intended manner to achieve an increased field of view of the imaging optical system 20 with a reduced length and size.

The presence of the prisms 46 and 76 makes it possible to have the short, compact WFOV system of the present approach. In an alternative approach that is not within the scope of the present approach, the lens modules 30 and 60 do not have their optical axes 34 and 64 parallel to each other, and instead are tilted outward with respect to the normal to the planar sensor structure 90. Consequently, there is an angular separation between the "best" image planes of the two lens modules 30 and 60, relative to the planar sensor structure 90. The result is a significant defocussing of the image.

To prevent the formation of a "ghost" image spillover between the lens modules 30 and 60 in the present approach, a baffle 84 in the form of an opaque wall is optionally but preferable positioned between the two lense modules 30 and 60 over at least a portion of their lengths adjacent to the lens planar sensor structure 90. Where there are more than two imaging structures, each imaging structure is preferably isolated from the other imaging structures by an opaque light baffle.

It is preferred that an angle A between the first optical axis 34 and the first normal orientation 50 be +θ, and an angle B between the second optical axis 64 and the second normal orientation 80 be −θ. That is, the magnitudes of these angles are the same, but they are of different sign.

A planar sensor structure 90 is positioned to receive light at the first focal plane 36 and at the second focal plane 66. The first optical axis 34 and the second optical axis 64 pass through the planar sensor structure 90. The planar sensor structure 90 is desirably one or more focal plane arrays that receive the light and convert it to electrical or other analyzable signals. Focal plane arrays are known for the various wavelength ranges of light, including ultraviolet, visible, and infrared ranges, and subranges thereof. Preferably, the first focal plane 36 and the second focal plane 66 lie in and are coplanar in a common focal plane 92. In this preferred embodiment, the planar sensor structure 90 lies in a single plane in the common focal plane 92. Most preferably, the planar sensor structure 90 is a single (i.e., exactly one) focal plane array 94, although more than one focal plane array may be used where appropriate.

As used herein, a field of view is defined as the maximum angular viewing range, for the imaging optical system 20 taken as a whole or for any of the individual imaging structures, such as the imaging structures 22, 26. The first field of view 24 is the maximum angular viewing range of the first imaging structure 22, including both the first lens module 30 and the first prism 46. The second field of view 28 is the maximum angular viewing range of the second imaging structure 26, including both the second lens module 60 and the second prism 76.

In the preferred embodiment of FIG. 1, the first normal orientation 50 and the second normal orientation 80 lie in a first-second optical axis plane 96, which in FIG. 1 is the plane of the illustration. The first-second optical axis plane also contains the first optical axis 34 and the second optical axis 66. In the embodiment, a total field of view 98 of the imaging optical system 20 in the first-second optical axis plane 96 is a sum of a numerical value of the first field of view 24 in the first-second optical axis plane 96 plus the numerical value of the second field of view 28 in the first-second optical axis plane 96.

The imaging optical system 20 of FIG. 1 achieves an increased field of view 98 in the first-second optical axis plane 96, which is the plane of the illustration in FIG. 1. In many applications, it is desirable that the field of view be increased in two mutually perpendicular planes, so that the field of view is increased in both the azimuthal and the elevational angular orientations. The present approach allows such a general increasing of the fields of view, as described next.

Figure 2:
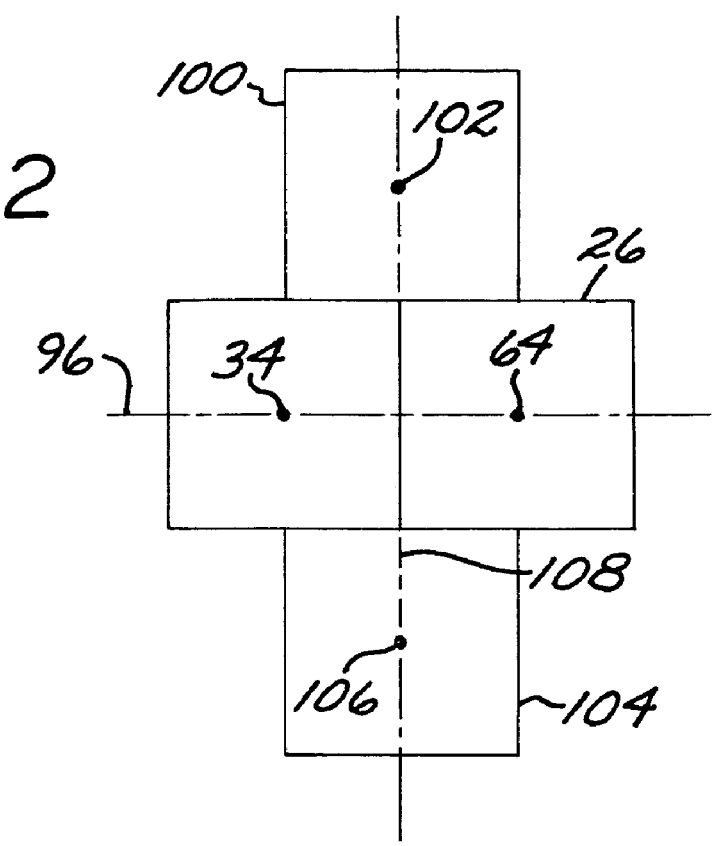
FIGS. 2 and 3 are end elevational views of three embodiments of a 2×2 imaging optical system that has an enhanced field of view relative to two perpendicular planes.
Figure 3:
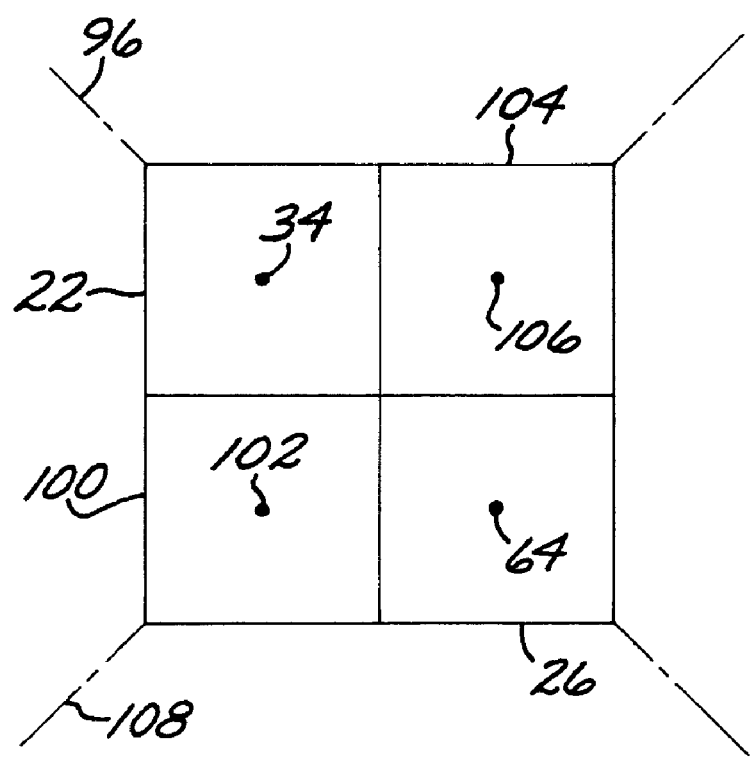

FIGS. 2 and 3 are views taken parallel to the optical axes 34 and 64, and additionally illustrating the presence of a third imaging structure 100 having a third optical axis 102 parallel to the first optical axis 34 and to the second optical axis 64. The third imaging structure has a third field of view. The third imaging structure 100 desirably forms its image on the common focal plane 92 (which is not visible in FIGS. 2 and 3). There is also a fourth imaging structure 104 having a fourth optical axis 106 parallel to the third optical axis 102 (and thence parallel to the first optical axis 34 and to the second optical axis 64). The fourth imaging structure has a fourth field of view different from the third field of view. The fourth imaging structure 104 forms its image on the common focal plane 92. The third optical axis 102 and the fourth optical axis 106 lie in a third-fourth optical axis plane 108 that is perpendicular to the first-second optical axis plane 96.

The third imaging structure 100 and the fourth imaging structure 104 desirably each have the same structure (but not the same spatial orientation), each comprising a lens module and a prism, as the first imaging structure 22 and the second imaging structure 26. The discussion of the first imaging structure 22 and the second imaging structure 26 is incorporated herein as modified to apply to the third imaging structure 100 and the fourth imaging structure 104. The third normal orientation and the fourth normal orientation are different from each other and from the first normal orientation 50 and the second normal orientation 80. It is preferred that the angle between the third optical axis 102 and the third normal orientation be +φ, and the angle between the fourth optical axis 106 and the fourth normal orientation be −φ measured in the third-fourth axis optical plane 108. That is, the magnitudes of these angles are the same, but they are of different sign. The values of θ and φ may be the same or different. Stated alternatively, in the preferred embodiment of FIG. 2, a view in the third-fourth axis optical plane 108 would be like that of FIG. 1, except that the third imaging structure 100 and the fourth imaging structure 104 would be laterally separated, and the magnitudes of the angles A and B may be different from the magnitudes of angles A and B in FIG. 1. In the embodiment of FIG. 3, imaging structures all meet at a center line.

Figure 4:
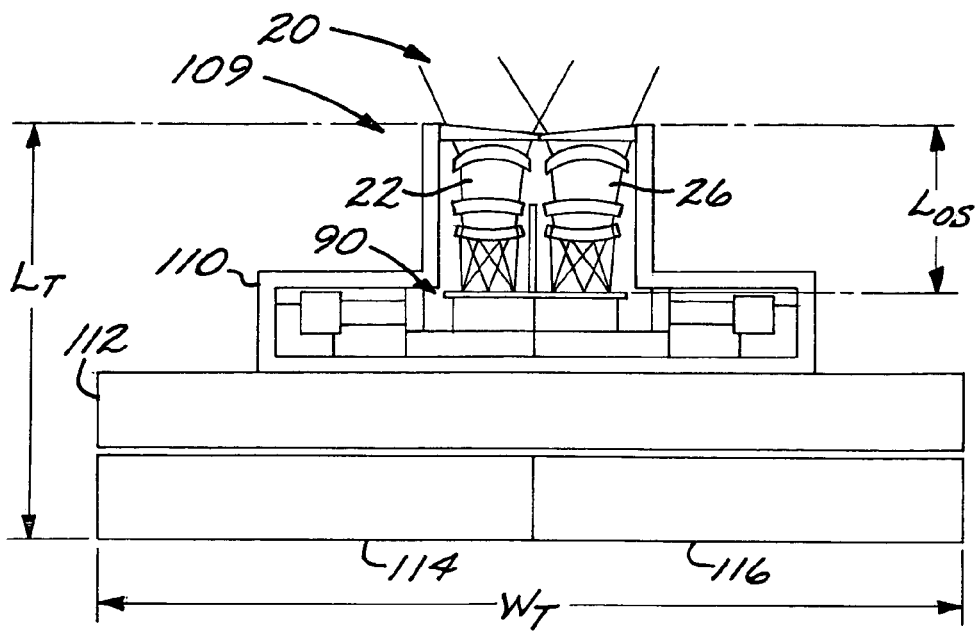
FIG. 4 is a schematic elevational drawing of an imaging optical system with integrated optical and electrical functionalities.

FIG. 4 depicts an integrated imaging device 109 using the present approach. The 2×2 imaging optical system 20, including the first imaging structure 22, the second imaging structure 26, the third imaging structure 100, the fourth imaging structure 104, and the planar sensor structure 90, are contained in a housing 110 supported on a front side of a substrate 112. Digital electronics 114 and analog electronics 116, as needed, are supported on an oppositely disposed back side of the substrate 112. Output signals from the planar sensor structure 90 are provided to the electronics 114 and 116 for processing.

In an embodiment of the integrated imaging device 109 designed by the inventors, the imaging optical system 20 has an 60 degree×80 degree field of view 98. The length $L_{OS}$ of the imaging optical system 20 is 0.53 inches, the total length $L_T$ is 1.2 inches, and the substrate 112 is square in plan view with a total width $W_T$ in each direction of 2 inches. The length $L_T$ is about ⅓ of the length required for the same integrated imaging system using a conventional single inverse telephoto or fisheye lens to achieve the same field of view. The imaging structures may be designed using commercially available ray-tracing software such as the Code V$^R$ or Zemax software.

Figure 5:
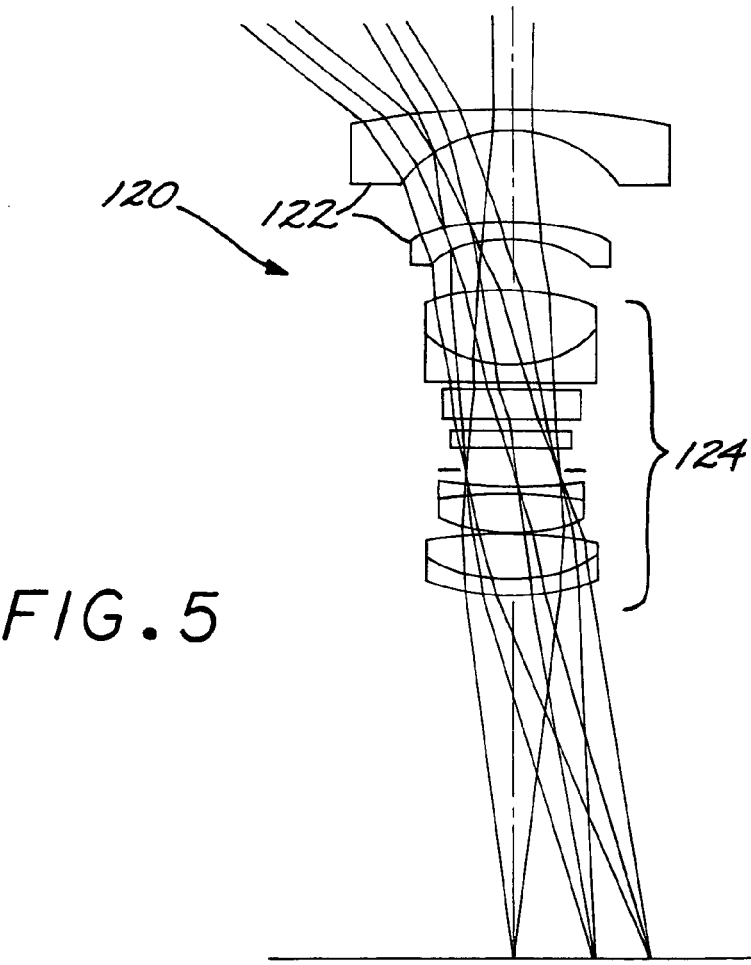
FIG. 5 is a schematic ray-path drawing of an inverse telephoto lens system.

FIG. 5 illustrates the ray paths for an inverse telephoto or fisheye lens structure 120 that is not within the scope of the present invention, and over which the present invention is an improvement. A front lens group 122 has a negative optical power, requiring greater positive optical power in a back lens group 124. The present approach avoids this arrangement of negative optical power/positive optical power through the use of the achromatic or apochromatic prisms, so that the imaging structures employ positive optical power/positive optical power (although weak negative power lenses may be present to aid in shaping the focal surface to planar).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging optical system comprising:
    a first imaging structure having a first field of view and including
        a first lens module having a first-lens-module input end, a first optical axis, and a first focal plane, and
        an achromatic or apochromatic first prism positioned adjacent to the first-lens-module input end and having a first prism outer face remote from the first-lens-module input end, wherein the first optical axis passes through the first prism, and wherein the first prism has a first normal orientation of the first prism outer face; and
    a second imaging structure parallel to the first imaging structure and having a second field of view different from the first field of view, wherein the second imaging structure includes
        a second lens module having a second-lens-module input end, a second optical axis parallel to the first optical axis, and a second focal plane, wherein the first focal plane and the second focal plane are coplanar in a common focal plane, and
        an achromatic or apochromatic second prism positioned adjacent to the second-lens-module input end and having a second prism outer face remote from the second-lens-module input end, wherein the second optical axis passes through the second prism, and wherein the second prism has a second normal orientation of the second prism outer face different from the first normal orientation of the first prism outer face; and
    a planar sensor structure lying in the common focal plane, wherein the first optical axis and the second optical axis pass through the planar sensor structure.

2. The imaging optical structure of claim 1, wherein the first lens module comprises a first Petzval lens, and the second lens module comprises a second Petzval lens.

3. The imaging optical structure of claim 1, wherein the first lens module comprises a first Petzval lens, and the second lens module comprises a second Petzval lens identical to the first Petzval lens.

4. The imaging optical structure of claim 1, wherein the first lens module and the second lens module are structurally identical.

5. The imaging optical structure of claim 1, wherein the planar sensor structure is exactly one focal plane array.

6. The imaging optical structure of claim 1, wherein the planar sensor structure comprises an infrared-wavelength sensor.

7. The imaging optical structure of claim 1, wherein the first normal orientation and the second normal orientation lie in a first-second optical axis plane that also contains the first optical axis and the second optical axis.

8. The imaging optical system of claim 7, further including
    a third imaging structure having a third optical axis parallel to the first optical axis and a third field of view, wherein the third imaging structure forms an image on the common focal plane, and
    a fourth imaging structure having a fourth optical axis parallel to the third optical axis and a fourth field of view different from the third field of view, wherein the fourth imaging structure forms an image on the common focal plane, and
wherein the third optical axis and the fourth optical axis lie in a third-fourth optical axis plane that is perpendicular to the first-second optical axis plane.

9. The imaging optical system of claim 1, wherein the first optical axis and the second optical axis lie in a first-second optical axis plane, and wherein a field of view of the imaging optical system in the first-second optical axis plane is a sum of the first field of view in the first-second optical axis plane plus the second field of view in the first-second optical axis plane.

10. An imaging optical system comprising:
    a first imaging structure having a first field of view and including
        a first lens module having a first-lens-module input end, a first optical axis, and a first focal plane, wherein the first lens module comprises a Petzval lens, and
        an achromatic or apochromatic first prism positioned adjacent to the first-lens-module input end and having a first prism outer face remote from the first-lens-module input end, wherein the first optical axis passes through the first prism, and wherein the first prism has a first normal orientation of the first prism outer face; and
    a second imaging structure parallel to the first imaging structure and having a second field of view different from the first field of view, wherein the second imaging structure includes
        a second lens module having a second-lens-module input end, a second optical axis parallel to the first optical axis, and a second focal plane, wherein the second image module comprises a Petzval lens structurally identical to the first Petzval lens, and wherein the first focal plane and the second focal plane are coplanar in a common focal plane, and
        an achromatic or apochromatic second prism positioned adjacent to the second-lens-module input end and having a second prism outer face remote from the second-lens-module input end, wherein the second optical axis passes through the second prism, and wherein the second prism has a second normal orientation of the second prism outer face different from the first normal orientation of the first prism outer face; and
    a planar sensor structure lying in the common focal plane, wherein the first optical axis and the second optical axis pass through the planar sensor structure.

* * * * *